United States Patent [19]
Bahr et al.

[11] Patent Number: 4,814,771
[45] Date of Patent: Mar. 21, 1989

[54] APPARATUS AND METHOD FOR RECEIVING AND PROESSING LORAN SIGNALS

[75] Inventors: Dennis E. Bahr, Middleton; Neil K. Fortney, Madison, both of Wis.; Michael Skroch, Albuquerque, N. Mex.; Erich T. Ziemann, Middleton; Kendall E. Post, Madison, both of Wis.

[73] Assignee: Bahr Technologies, Inc., Madison, Wis.

[21] Appl. No.: 101,951

[22] Filed: Sep. 28, 1987

[51] Int. Cl.$^4$ ................................................ G01S 1/24
[52] U.S. Cl. .................................... 342/389; 342/390; 364/452
[58] Field of Search ................. 342/389, 390; 364/452

[56] References Cited
U.S. PATENT DOCUMENTS 3,947,849  3/1976  Fehlner et al. .
4,166,275  8/1979  Michaels .
4,268,830  5/1981  Brodeur ............................. 342/389
4,468,668  8/1984  Brodeur .
4,482,896  11/1984  Menick ............................... 342/390

OTHER PUBLICATIONS

N. V. Thakor, "Adaptive Filtering of Evoked Potentials", IEE Transactions on Biomedical Engineering, vol. BME-34, No. 1, Jan. 1987, pp. 6–11.
A. E. Gaunt, et al., "The AN/ARN-101 Loran Receiver", paper presented at WGA Technical Symposium, Oct. 9, 1975.

Primary Examiner—Theodore M. Blum
Attorney, Agent, or Firm—Lathrop & Clark

[57] ABSTRACT

A radio signal containing Loran C pulses from stations of interest is received and periodically sampled to convert the input signal to sample data. The data is assigned to memory locations within an acquisition memory at positions in the memory which correspond to specific times within the group repetition interval (GRI) of the Loran chain of interest. A GRI counter assigns the locations in the memory to which the data are written and cycles the memory after the completion of each GRI so that new data corresponding to a new set of pulses from the master and secondary stations of the Loran C chain will be assigned to essentially the same memory locations as data acquired during a previous GRI. The new data is ensemble averaged with the old data contained in the memory locations and the averaged data stored back in the memory. As data is collected and averaged over a sufficient number of GRI's, any signals present in the received radio signal which are not synchronous with the GRI will tend to be averaged out, improving the signal to noise ratio of the Loran C pulses in the memory. Averaging of the sampled input signal over several GRI's in this manner minimizes the effect of sporadic noise, continuous wave interference and cross rate interference. After completion of the averaging process, the data in the acquisition memory may be searched to determine the time differences between the master and secondary pulses in a manner normally carried out in Loran C receivers.

19 Claims, 8 Drawing Sheets

|  | GROUP A | | | | | | | | | | GROUP B | | | | | | | | | |
|---|---|---|---|---|---|---|---|---|---|---|---|---|---|---|---|---|---|---|---|---|
|  | PULSE NO. | | | | | | | | | | PULSE NO. | | | | | | | | | |
|  | 0 | 1 | 2 | 3 | 4 | 5 | 6 | 7 | 8 | 9 | 0 | 1 | 2 | 3 | 4 | 5 | 6 | 7 | 8 | 9 |
| MASTER | + | + | − | − | + | − | + | − | N | + | + | − | − | + | + | + | + | + | N | − |
| SECONDARY | + | + | + | + | + | − | − | + | N | N | + | − | + | − | + | + | − | − | N | N |

FIG. 5

| GROUP | | MASTER GROUP A + B̄ | | | | | | | | | |
|---|---|---|---|---|---|---|---|---|---|---|---|
| | A | + | + | − | − | + | − | + | − | N | + |
| | B̄ | − | + | + | − | − | − | − | − | N | + |
| | SUM | 0 | +2 | 0 | −2 | 0 | −2 | 0 | −2 | 0 | +2 |

FIG. 6

| GROUP | | MASTER GROUP Ā + B | | | | | | | | | |
|---|---|---|---|---|---|---|---|---|---|---|---|
| | Ā | − | − | + | + | − | + | − | + | N | − |
| | B | + | − | − | + | + | + | + | + | N | − |
| | SUM | 0 | −2 | 0 | +2 | 0 | +2 | 0 | +2 | 0 | −2 |

FIG. 7

| GROUP | | SECONDARY GROUP A + B̄ | | | | | | | |
|---|---|---|---|---|---|---|---|---|---|
| | A | + | + | + | + | + | − | − | + |
| | B̄ | − | + | − | + | − | − | + | + |
| | | 0 | +2 | 0 | +2 | 0 | −2 | 0 | +2 |

FIG. 8

| GROUP | | SECONDARY GROUP Ā + B | | | | | | | |
|---|---|---|---|---|---|---|---|---|---|
| | Ā | − | − | − | − | − | + | + | − |
| | B | + | − | + | − | + | + | − | − |
| | | 0 | −2 | 0 | −2 | 0 | +2 | 0 | −2 |

APPARATUS AND METHOD FOR RECEIVING AND PROESSING LORAN SIGNALS

FIELD OF THE INVENTION

This invention pertains generally to the field of navigational systems and more particularly to LORAN C navigational systems.

BACKGROUND OF THE INVENTION

LORAN C is a radio navigation system operating in the low frequency portion of the radio frequency spectrum at a carrier frequency of 100 kHz. The system utilizes chains which each consist of one master and several secondary stations situated at widely separated geographic locations. The master and secondary stations of each chain transmit at the same frequency but at different times. Each of the secondary stations transmits a series of eight closely and equally spaced radio frequency pulses, designated a pulse group, while the master station transmits a similar series of eight pulses followed by a delayed ninth pulse which is included for identification of the master station. Each master and secondary station continuously repeats the transmission of its pulse group at a time spacing equal to the Group Repetition Interval (GRI) which is assigned to the chain to which the master or secondary station belongs. Typical GRI's range from about 40 to 100 milliseconds. The master station provides the time reference for all of the stations in its chain. Its pulse group is transmitted first, followed in time by a pulse group transmission from the secondary stations in the chain in a selected order. The time of transmission of pulse groups by each of the secondary stations is selected so that there is no overlap in the reception of any of these pulse groups from the master or secondary stations by a receiver located anywhere within the nominal coverage area of the particular LORAN C chain.

In the hyperbolic or range-difference mode of operation, the location or "fix" of a Loran C receiver within the coverage area of the chain is determined by synchronizing the receiver to the group repetition interval (GRI) at which the master and secondary stations of the particular chain are transmitting. The receiver calculates the difference between the time of arrival at the receiving station of the master station pulse group and each secondary station pulse group. For each pair consisting of a master station and a secondary station, a particular time difference will correspond to a hyperbolic line of position (LOP) on the surface of the earth which is a constant difference of distance between the master station and the particular secondary station, corresponding to a constant difference in the propagation time of the radio signal from the master stations and the secondary station. If the LORAN C receiver can detect signals from a master and two secondary station within a single chain, two lines of position may be determined by the receiver. The geographic point at which these two hyperbolic lines of position intersect provides an estimate of the location of the LORAN C receiver.

In the circular geometric or direct-ranging mode, the location of a receiving station within the coverage of a LORAN C chain is determined by calculating the time of transmission of signals from stations. When these time differences have been calculated, the distances from the transmitting stations to the receiver can be computed. These distances correspond to radii of circles about the respective transmitting stations; the point of intersection of the three circles from the transmitting stations provides an estimate of the location of the receiver. To operate in this mode, it is generally necessary that the receiver have a highly stable and accurate master clock which can be synchronized to the pulse transmission times of the transmitters within the LORAN C chain. It is also possible to use a modified technique where such a highly accurate clock is not available. In this alternative, a first and second pair of stations is utilized (one station of which can be common to both pairs) to perform the calculations of distances from the transmitters to the receiver. Since the actual location of the receiver must ultimately be the same for calculations for both pairs of transmitters, the process can be iteratively applied to data obtained from both pairs of transmitters until the exact time of transmission of the pulses from the pairs of transmitters is determined. The only requirement for the receiver's internal clock when utilizing this technique is that it have good short term stability so that the measurements made during the iteration process can be accurately referenced to the receiver's clock.

The radio signals available to LORAN C navigation receivers often have very low signal to noise ratios, making it difficult for the receiver to locate precise positions on each pulse waveform from the master and secondary stations with the accuracy needed to determine the exact timing relationship between the stations. In addition, LORAN C navigation is increasingly used in terrestrial and aeronautical applications in which the presence of various types of interfering radio frequency energy are more likely to be found than in the traditional maritime applications of LORAN. These other sources of interference include power lines, commercial radio and television signals, and spurious radiation from many industrial and consumer products. Most of the interference from these types of sources are characterized by continuous wave transmission. The presence of continuous wave interference within the LORAN C bandwidth may make the reception of useful LORAN C navigation signal data difficult and sometimes impossible. The expansion of LORAN C into non-marine applications and the subsequent construction of more LORAN chains increases the potential for interference by transmission from neighboring chains, giving rise to cross rate interference (CRI) which is, of course, concentrated at the LORAN C carrier frequency. In addition to the greater potential interference contaminating the LORAN C signal in non-marine applications, such non-marine applications may require that the receiver make a measurement of position within a shorter time. The relatively slow movement of ships allows a relatively long period of time in which the LORAN C receiver can acquire the signals and begin performing meaurements. However, when LORAN is being used for terrestrial navigation, and particularly for aircraft navigation, the significantly higher speeds at which the receiver is moving makes it essential that the receiver be able to rapidly acquire a signal and make a determination of position from the acquired signal information.

SUMMARY OF THE INVENTION

In accordance with the present invention, a radio signal containing the LORAN C signal of interest is received, filtered and amplified and then periodically sampled to convert the continuously varying input signal to a stream of data representing the magnitude of the signal at the sample times. The data may be acquired in either digital or analog form. The timing of the acquisition of sample data is synchronized to the Group Repetition Interval (GRI) for the LORAN C chain of interest and the data is assigned to memory locations within an acquisition memory at positions in the memory which correspond to specific times within the GRI. The locations to which the data are written into the memory are cycled after the completion of each GRI so that new data corresponding to a new set of pulses from the master and secondary stations during the GRI will be assigned to essentially the same memory locations as data acquired during a previous GRI. The existing contents of each memory location may be averaged, preferably by cumulative adding, with the new data which is designated for that memory location so that the resultant value, is a weighted sum of the new data and the previous content of the memory location. This resultant value is then written back in to the designated memory location. This process-of adding new data to existing data in memory and rewriting the memory locations over several GRI's yields ensemble averaged signal data within the memory. As data is collected and averaged over a sufficient number of GRI's, extraneous signals which are not synchronous with the GRI will tend to be averaged out, improving the signal to noise ratio of the data within the memory in accordance with the square root of the number of GRI's that are averaged. By ensemble averaging in this manner, sporadic noise such as atmospheric noise, continuous wave interference, and cross rate interference may be substantially reduced so that the resulting signal to noise ratio is significantly improved over signal to noise ratios encountered in conventional LORAN C receivers. In particular, the content of the acquisition memory after completion of ensemble averaging in accordance with the present invention may be utilized for determining time differences between master and secondary pulses in a conventional fashion as carried out in LORAN C receivers, but with the substantial additional advantage of providing a linear representation of the signal to preserve the maximum amount of information available in the pulse signals. This capability is not available in conventional hard limited LORAN receivers which utilize information only from zero crossings of the received input signal. By preserving the pulse shape information and making it available for further processing by the receiver, relatively less time is required for a receiver of the present invention to locate accurately the time differences between master and secondary pulses and determine a position fix.

A LORAN receiver constructed in accordance with the invention includes a signal processing unit including a time base generator, a radio frequency unit, a cycle detector unit and a digital computer unit. The radio frequency unit processes the signal corresponding to the received radio wave so that the signal is available within specified voltage levels with negligible distortion while allowing the gain to be varied without distorting the desired LORAN signal embedded with the received signal. The cycle detector unit provides time domain data representing a known point in the LORAN C pulses which are detected. The function of the cycle detector unit may be implemented in digital or analog form in a conventional fashion. The digital computer unit includes a microprocessor based digital computer and its associated input and output interfaces. These interfaces are of two types: a control/indicator which provides input and output communication with the user and a guidance and control sub-system which may provide guidance displays, auto pilot signals, and so forth. The computer contains the software programs embodying signal processing control algorithms which implement the present invention as well as receiver and navigational functions and overall program control.

The signal processing unit includes all of the logical functions necessary to accomplish the ensemble averaging of the input signal received from the radio frequency unit. The signal processing unit preferably includes an analog to digital converter for sampling the input signal at regular points in time and providing a time series of digital output data corresponding to the magnitude of the continuously varying input signal. The signal processing unit also includes a large random access acquisition memory configured for recirculating storage. A GRI counter provides signals which are used as the RAM address lines. When the GRI counter rolls over, the memory address pointed to by the counter corresponds to the first location in a new GRI period which is synchronized in time so that such location corresponds to the first location of all previous GRI periods. An adder connected to the data input of the acquisition memory sums the present contents of a memory location with the newly sampled data from the analog to digital converter in a read-modify-write cycle. The new data from the analog to digital converter can be added to the old data in a normal or complemented form to allow the optimum addition of phase coincident data in a pattern that matches the phase code changes of the transmitted pulses. Proper phase addition is of particular value in the successful rejection of continuous wave interference such as interference from sky wave reflections of the master or secondary station pulses. The same averaging of new data samples with old data may also be accomplished using an analog memory, in which case the data in the memory is not converted to digital form, if at all, until after ensemble averaging of analog data in the memory has been completed.

The data received from the analog to digital converter in the time period immediately prior to a pulse is also evaluated to determine whether its amplitude falls within an acceptable range. Over-range excursions of data are evaluated in terms of the number of occurrences per interval as compared to a selected limit for such number of occurrences. If the limit is exceeded, the forthcoming data is not added to the data in the memory and thus not averaged into the composite waveform built up in the memory, thereby minimizing the effect of burst or impulse noise and large cross rate interference signals. The analog gain stage of the signal processing unit is controlled by the computer to optimize the framing of the new data from the analog to digital converter to optimize the rejection of continuous wave interference and cross rate interference.

To obtain the proper synchronism of the GRI counter and the master station GRI period, a highly stable high-frequency master clock supplies clock signals to the GRI counter. The master clock is controlled by the program within the digital computer to allow the computer to search for and synchronize the timing between the local GRI counter and the LORAN master transmitter.

Further objects, features and advantages of the invention will be apparent from the following detailed description when taking in conjunction with the accompanying drawings.

BRIEF DESCRIPTION OF THE DRAWINGS

In the drawings:

FIGS. 614 9 are tables showing the effect of adding alternately phased A and B pulse groups in the various possible combinations of these groups.

FIGS. 10 a–c are graphical representations of the pulses within a GRI period before processing, the result of summation of the pulses with alternating phasing in two successive GRI periods, and typical zoned gains for the pulse groups within the GRI.

DESCRIPTION OF THE PREFERRED EMBODIMENT

Figure 2:
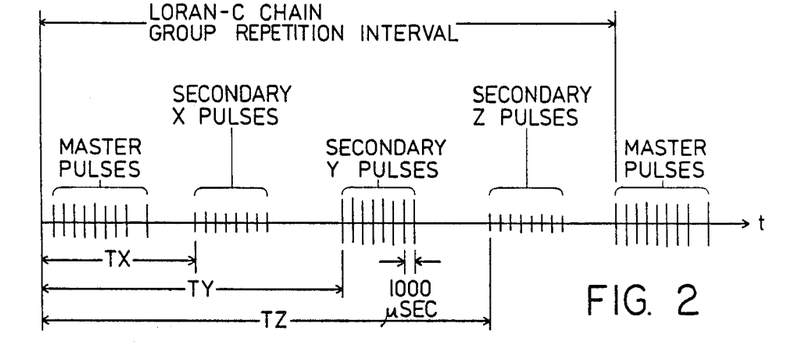
FIG. 2 is a graphical representation of the pulse groups transmitted by the master and secondary stations within a Loran C chain.

As a basis for understanding the manner in which the signal processing and ensemble averaging of the present invention provides improved performance in a Loran C receiver, it is useful to review the manner in which Loran C pulse signals are transmitted and received. All master and secondary stations transmit groups of pulses spaced at a specified group repetition interval (GRI) which is illustratively shown in FIG. 2 for a chain having a master station and 3 secondary stations, designated X, Y and Z. Each pulse transmitted by the master and secondary stations has a 100 kHz carrier which is modulated to have the pulse shape shown in FIG. 4. A pulse group for the master station is shown in more detail in FIG. 3 and will be composed of nine pulses. Each secondary station transmits eight pulses which are identical to the first eight pulses shown in FIG. 3. For each Loran C chain a group repetition interval (GRI) has been assigned which is of sufficient length so that there is time for all of the pulses from the master and secondary stations to be received without overlap anywhere in the Loran C chain coverage area. In addition, the time between pulses is sufficient so that sky waves from a pulse in one group should not overlap the ground waves from subsequent pulses of a group transmitted by another station in the chain. Each of the pulses within a group are spaced exactly 1000 microseconds apart except for the ninth pulse of the master station which is spaced exactly 2000 microseconds after the eighth pulse. FIG. 2 illustrates the timing of the various pulses for a chain, wherein the pulses from each of the stations never overlap each other and are all received within the GRI. The representative time differences of arrival of the pulse group from each of the secondary stations with respect to the master station are also illustrated in FIG. 2, designated $T_x$, $T_y$ and $T_z$. These time differences are the basic information used by the Loran receiver to calculate navigation data.

The basic assumption underlying the effective use of Loran C in the hyperbolic mode is that the time differences of arrival between the pulse group from the master station and the pulse groups from the secondary stations will vary in accordance with the location of the receiver within the coverage area of the Loran C chain. The strength of the signals received by the Loran C receiver will also vary depending on the location of the receiving equipment, which is illustrated by the different heights of the representative pulses shown in FIG. 2.

The ninth pulse of each series of pulses from the master station serves to differentiate the master from the secondary stations but can also be used to communicate chain status through the use of "blink" codes. A sequence of "on" and "off" patterns of the ninth pulse are used to accomplish the transmission of coded information in a well-known manner to indicate faulty secondary stations in the chain. These "blink" codes are published by the Coast Guard on the Loran C navigation charts.

Figure 3:
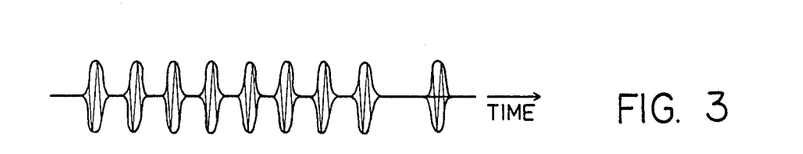
FIG. 3 is a more detailed graphical representation of the pulse group transmitted by a master station.
Figure 4:
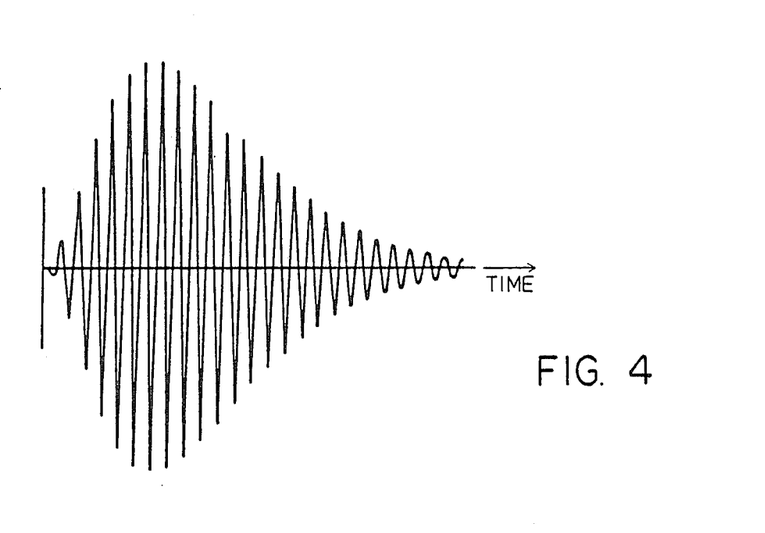
FIG. 4 is a graphical representation of the shape of one modulated carrier frequency pulse within the pulse groups transmitted by the master and secondary stations.
Figure 5:
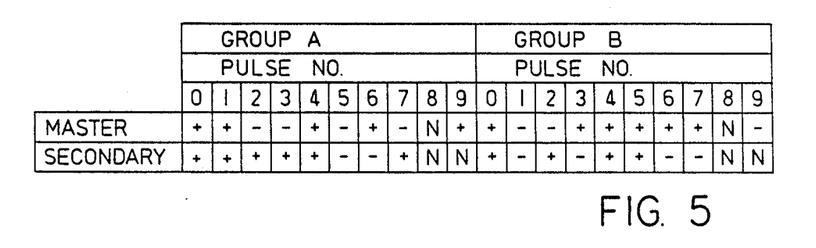
FIG. 5 is a table showing the phase codes of the individual pulses of the master and secondary station pulse groups.

Several anomalies in the propagation of the Loran C signal affect the tracking of pulse relationships between stations. One such factor are sky wave signals, which are echos of the transmitted pulses reflected off of the ionosphere. Such sky waves may arrive at the Loran receiver at any time between 35 microseconds and 1000 microseconds after the ground wave pulse is received. In the case of a 35 microsecond delay, the sky wave will overlap its own ground wave, while in the case of a 1000 microsecond delay, the sky wave will overlap the ground wave of a succeeding pulse. In either case, the sky wave signal distorts the apparent pulse received by the receiver, causing fading and pulse shape changes, both of which can contribute to positional errors. In some cases, the sky wave may be received at a greater amplitude than the ground wave. To prevent the delayed sky wave from affecting time difference measurements, the phase of the 100 Hz carrier is changed by the transmitting stations for selected pulses of each pulse train in accordance with a predetermined pattern. The table of FIG. 3 shows the standard phasing patterns for a master and secondary station and reveals the two patterns, labeled A and B, that are alternately transmitted by each station. A Loran receiver can also make use of the phase coding of the transmitted signals to minimize the effect of phase coherent interference if proper synchronization is maintained between the transmitted pulse groups A and B in the receiver circuitry.

Figure 1:
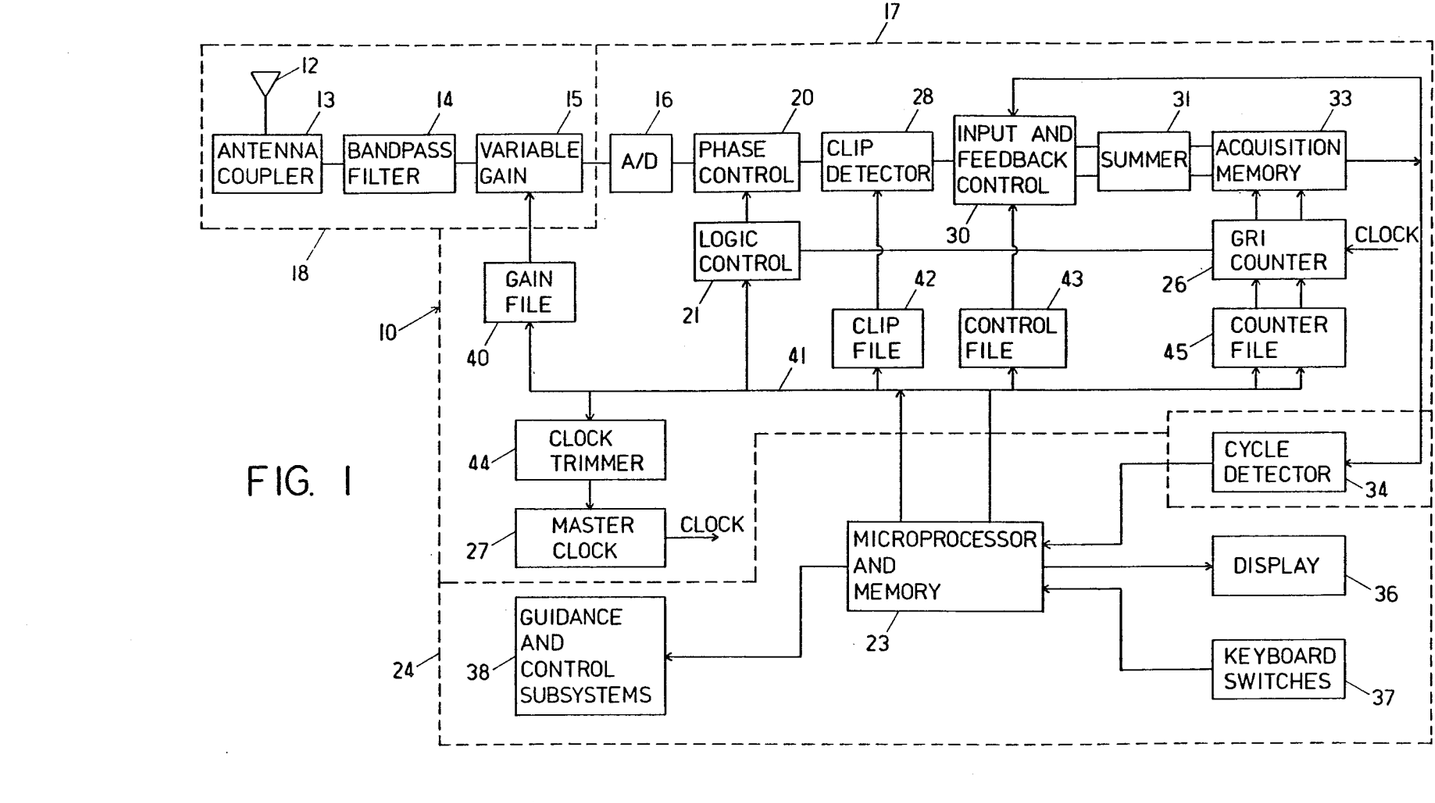
FIG. 1 is a block diagram showing the functional elements of a Loran C receiver incorporating the present invention.

In view of the general background of Loran signal processing set forth above, the signal processing receiver system of the present invention may now be described with reference to the block diagram of FIG. 1 in which the system is shown generally at 10. Radio waves are picked up by an antenna 12 and the electrical signals from the antenna are passed through an antenna coupler 13 and a band pass filter 14, all of conventional design of the type used in present Loran C navigation receivers, and which are permanently tuned to a center frequency of 100 kHz. The filter 14 has a band pass of approximately 50 kHz at the minus 30 dB cutoff points. The signal from the band pass filter is provided to a variable gain circuit 15 which adjusts the magnitude of the signal so that the pulse group of interest is of a proper amplitude before the signal is sampled by an analog to digital converter 16. The antenna 12, antenna coupler 13, band pass filter 14, and variable gain circuit 15 form a radio frequency unit 18.

The analog to digital converter 16 forms part of a signal processing unit 17. The digitizer 16 is preferably a high speed flash converter (e.g., type CA3306) having at least six bits of resolution, allowing it to provide five bits of amplitude data and one sign bit after conversion. The sample rate of the digitizer 16 is preferably relatively rapid so that it will be greater than the Nyquist frequency of the highest frequency of interest in the received signal after filtering. Satisfactory results may be obtained with a conversion rate of 600 kHz or higher, while lower sampling rates may be utilized under some conditions. The digital data from the digitizer 16, for example, provided in parallel form on a six line bus, is passed to a phase control circuit 20 which will either pass the digital data unmodified or complement the data, as appropriate, to provide constructive addition of GRI synchronous Loran C pulses within the chain of interest as explained further below. Preferably, the phase control circuit is controlled to complement the data in every other GRI. The phase code pattern is controlled by a logic control circuit 21 under control of the programming within a microprocessor (e.g., of the type HD64180) 23 with associated RAM and ROM memory which forms a part of the digital computer unit 24. Timing information is provided by a GRI counter 26 and indirectly by the system master clock 27. The digital data from the phase control circuit 20 is then provided to a clip detector 28 where the data is evaluated to determine whether the data is over-range. Criteria are established by the programming of the microprocessor as to the levels of signal data that will be considered over-range and the number of occurrences of over-range data that will be allowed in a given span of time. Pulse data exceeding the limits are not passed by the clip detector and are not applied to the subsequent processing circuitry.

Valid data are fed from the clip detector 28 to input feedback control logic 30 before summation of the data at an adder 31. The data from the adder is supplied to a large random access digital acquisition memory 33 (e.g., of the type HY 51C466 or MB 81C466) which accumulates data in a number of memory locations corresponding to the number of samples taken in an entire GRI. The averaged data is accumulated in the memory over several successive GRI periods until a selected number of periods have occurred As used herein, the "averaging" or "ensemble averaging" of data in the acquisition memory is the addition of new data to previously acquired data in such a way that the resulting value in memory reflects the value of both new and historical data. Where a relatively low resolution analog to digital converter is used, it is generally preferred that the new data be purely added to the old data so that the ensemble averaged data in the memory will have greater resolution than the output of the digitizer. For example, the digitizer may have a 6 bit output word while the memory may store 12 or 16 bits at each memory location.

The memory locations are assigned by the GRI counter 26, which is connected to the address lines of the memory, and the GRI counter is set to roll over back to the initial address when a selected number of samples have been assigned to memory, corresponding to a selected GRI time period. As explained below, the GRI time period used by the GRI counter may change as the receiver seeks to determine the actual GRI of the chain which it is receiving.

When the specified number of samples have been averaged into the memory, the output of the memory is routed to a cycle detector 34. The cycle detector, which may be of conventional design for Loran receivers, determines a standard reference point on a pulse in each pulse group. This may be accomplished in a digital manner or in a conventional analog circuit by converting the digital signal back to an analog signal in the cycle detector. The standard point of reference is usually the third zero crossing of each pulse, and is used as a basis for measuring time differences between respective pulse groups. The microprocessor utilizes this time difference information to perform the necessary calculations for conversion of the time delay data into position information such as latitude-longitude readings. The readings calculated by the microprocessor are shown to the user on a display panel 36, such as a conventional LED or liquid-crystal read out, and commands from the user to the system determining what information is to be displayed and what calculations are to be performed are entered through keyboard switches 37. The microprocessor may also pass on the calculated data to guidance and control subsystems 38 which can perform computations necessary to provide information useful to other navigational equipment, such as an autopilot.

The signal processing unit additionally includes units in communication with the microprocessor which interface the microprocessor to the various subsystems which affect the signal as it is being processed. These include a gain file 40 connected to the main bus 41 of the microprocessor which acts under the control of the microprocessor to provide variable gain control signals to the gain control circuit 15. A clip file 42 similarly is controlled by the microprocessor to provide clip control signals to the clip detector 28 and a control file 43 receives input data from the microprocessor to control the input and feedback control circuit 30. A clock trimmer 44 receives input from the microprocessor to adjust the master clock 27 frequency over a narrow range to allow the microprocessor to search and optimize the timing between the local GRI counter and the Loran master transmitter. A counter file 45 also receives control inputs from the microprocessor to change the GRI sample count at which the counter rolls over and cycles the acquisition memory back to its initial memory location. Each of the foregoing files can function as independant hardware units under the control of the microprocessor or can be incorporated into the microprocessor itself and its associated system read only memory (ROM) (not shown) to control the programming operations so that the microprocessor directly controls the circuitry in the signal path.

Figure 6:
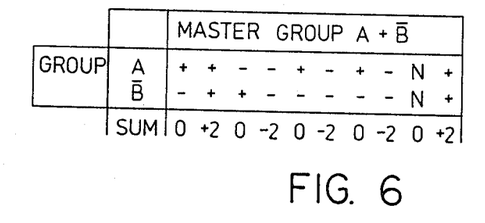
Figure 7:
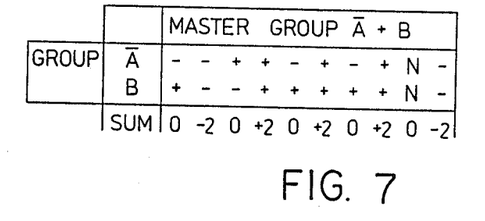
Figure 8:
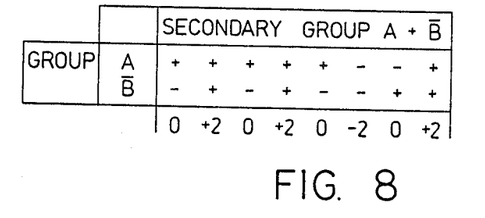
Figure 9:
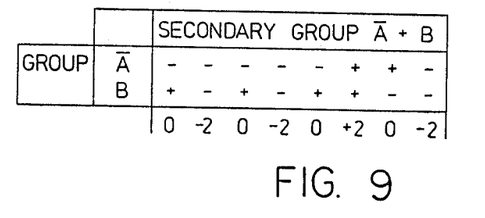

With reference to the components of the system set forth above, the signal processing operations of the present invention may be considered in greater detail. The conditioned radio frequency signal, in analog form, from the radio frequency unit 18 is digitized in the analog to digital converter 16 which preferably provides two's complement binary output data. The phase control circuitry 20 causes the data to be passed either unmodified or complemented in accordance with the logical direction provided by the logic control circuit 21. One form of phase control which may be utilized in the present invention is alternate GRI phase reversals, accomplished by complementing data from every other GRI. The consequence of such alternate phase reversals may be illustrated by first considering the system as it acquires the master A pulse group into memory. The top row of FIG. 6 shows the phase polarity of an acquired GRI signal. If the input data is complemented exactly one GRI period later, which effectively provides data of the opposite phase, the master pulse group B will have the phase pattern shown by the lower row of FIG. 6. When the two GRI's are added together, alternate cancellation and reinforcement of the A and B patterns will occur, and a total of five pulses out of the nine will be constructively added and the others will cancel. A consideration of the effect of the phase reversals and successive additions of GRI's upon the secondary groups reveals that there is constructive addition of four of the eight pulses transmitted, as shown FIGS. 8 and 9, and cancellation of the rest. In all cases, these pulses which are constructively added are spaced two milliseconds apart, with the master group being distingushed by having one pulse more (5 pulses) than the secondary groups. The foregoing technique assumes the proper alignment of the phase change at the start of a group repetition interval. Since the microprocessor may not initially know the true starting point in time of a GRI, the initial alignment will be random. This initial nonalignment is not a concern since the only effect it has on the alternate phase change averaging technique is to cause a sign change in any pulse positioned at the phase change point. The microprocessor will make adjustments to the GRI counter until alignment of the pulse groups is properly accomplished.

Figure 10A:
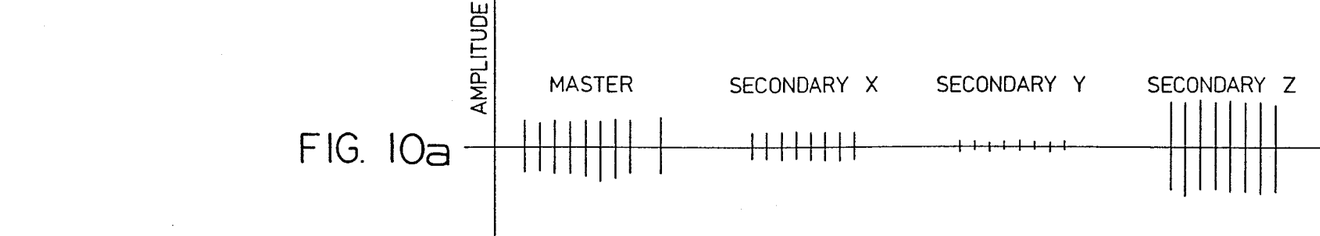
Figure 10B:
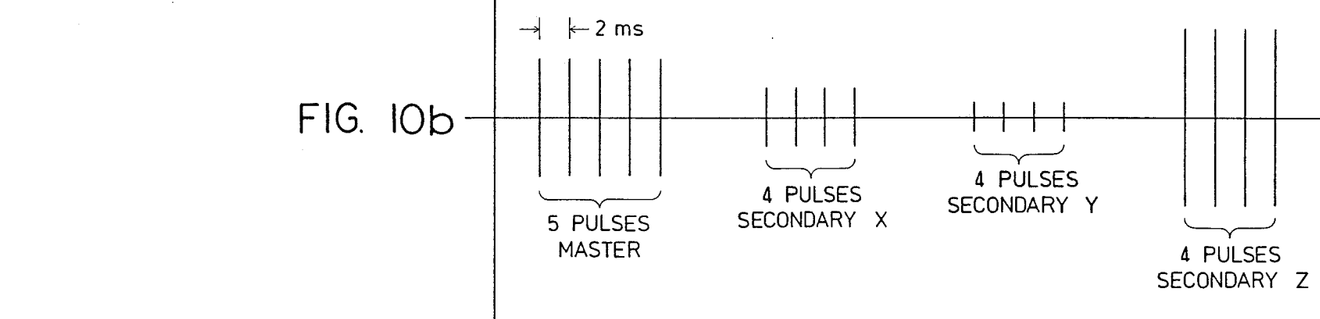
Figure 10C:
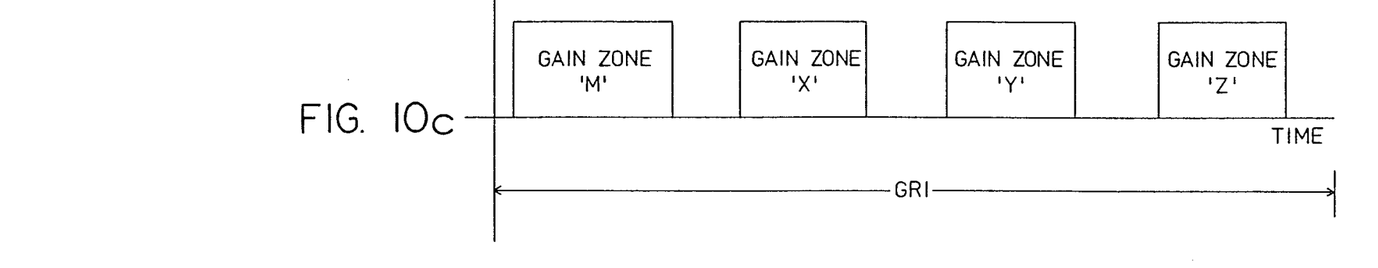

In FIG. 10a, a typical Loran C pulse sequence is represented as-received by a navigation receiver, while in FIG. 10b the relative amplitudes and positions of the pulses after two (or many) GRI periods are averaged is shown. With this data in the acquisition memory, the microprocessor can begin to determine the location of the master and secondary pulse groups within the GRI and, if necessary, make gain adjustments by means of the variable gain circuit 15 to properly frame data within the acquisition window of the analog to digital converter 16. The gain of the circuit 15 can be determined in accordance with various algorithms—for example, using a fixed gain over the entire interval corresponding to the value dictated by the weakest station or, alternatively, gain zoning where the gain for each group of pulses can be defined, with the microprocessor keeping track of when the gain should be changed during the GRI interval to accomodate the next pulse group. The magnitude of gain zones over the GRI shown in FIG. 10c enhances signals received during the pulse groups and suppresses signals received between the pulse groups. The gain zones are of sufficient width to capture the pulse group of the master station and each secondary station. The gain of each zone is adjusted so that the cycle detector will see Loran pulses of approximately equal amplitudes as the memory is circulated after acquisition. The microprocessor also factors into the navigation calculations the amount of phase delay that each pulse group will experience as a result of differing signal paths and gain values due to the gain zoning. At the same time that the microprocessor makes adjustments to align the pulse groups within the acquisition period, it can also verify the synchrony between the local master oscillator 27 driving the GRI counter 26 and the chain transmitters. This is accomplished by adjusting the master clock trimmer circuit 44 until any shifting of the master clock pulse train between successive averaging intervals is eliminated. Shifting can be caused by two factors, movement of the observer relative to the master station and lack of synchronism between the master and receiver clock periods. The latter factor must be satisfied for effective long term signal averaging, while the former factor can be accomodated in the position calculating algorithms. For relatively low rates of observer movement, (less than 200 km/hr) over short acquisition times (one second or less), shifting due to observer movement can be ignored during the clock synchronization phase.

When an acquisition has been made over many GRI periods, non-coincident signals such as noise, continuous wave interference and cross rate interference will be added in the respective memory locations of the acquisition memory 33 in a random pattern to the Loran signals of interest. At least half of the Loran C signals of interest will undergo successive increases in their relative amplitude within the memory 33 due to the coincident or coherent nature of their reception and assignment into the memory with respect to the GRI interval. The overall effect is that the signal to noise ratio of the composite signal within the memory 33 improves as a function of the square root of the number of GRI periods averaged. After averaging has been accomplished, the resulting information within the memory can then be recirculated and the resulting data either converted back to analog form for further processing by a conventional cycle detector and subsequent detection of reference points on the individual pulses, or the microprocessor can access the memory directly and digitally scan the data for the proper reference points. When these points are determined, conventional techniques can be used to make appropriate calculations for deriving navigational data from the Loran C waveforms.

Figure 11:
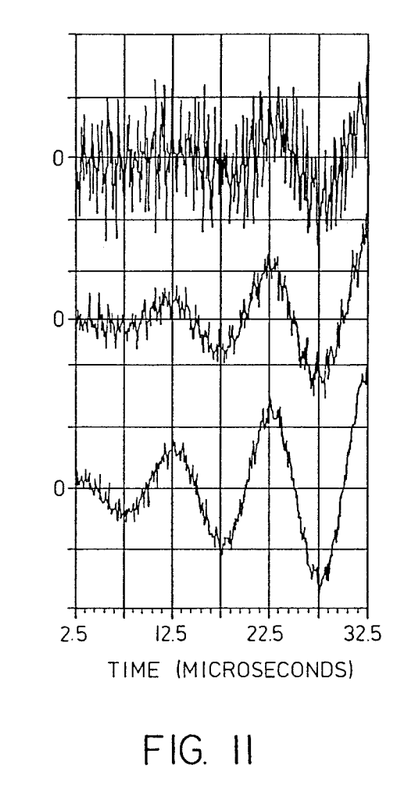
FIG. 11 are graphical representations of the effect of signal averaging on a signal contaminated with Gaussian noise showing the initial signal, the signal after averaging over eight GRI's and the signal after averaging over 80 GRI's.

FIG. 11 illustrates the effect of signal averaging on Gaussian noise superimposed on a Loran signal. The first curve in FIG. 11 is the raw signal as received with a signal to noise ratio of 0.1. The second signal is the data in the memory 33 after averaging data from eight GRI periods. The bottom graph shows the data in the memory after 80 GRI periods have been averaged. As seen, a substantial reduction in the effect of noise is obtained and the Loran signal is effectively abstracted from the noise so that the zero crossing time points can be obtained with reasonable accuracy, which would be virtually impossible to do with the highly contaminated original signal.

Figure 12:
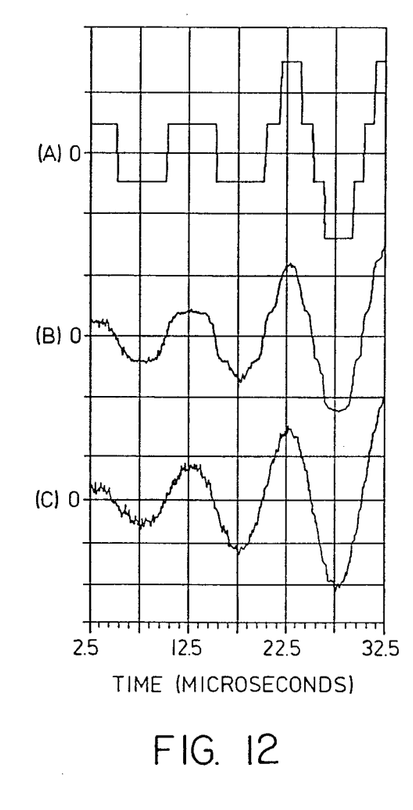
FIG. 12 are graphical representations illustrating the effect of Gaussian noise on the averaged output of a three bit digitizer having 80 GRI's averaged, showing the averaged signal with no noise, with a signal to noise ratio of 0.5, and with a signal to noise ratio of 0.2.

FIG. 12 illustrates the effect of Gaussian noise on the output of a digitizer of relatively limited resolution, in this case a three bit digitizer. Each of the three graphs in FIG. 12 represents a portion of the content of the memory 33 after the data taken from 80 GRI periods has been averaged. The first graph shows the content of the memory with no noise, which is essentially identical to the output of the digitizer for each signal. The second graph in FIG. 12 shows the effect of the addition of Gaussian noise at a signal to noise ratio of 0.5, and the third graph shows the effect of the addition of Gaussian noise at a signal to noise ratio of 0.2. As illustrated in these graphs, the effect of the presence of noise on the averaged signals in the memory is to effectively reconstruct a relatively faithful reproduction of the actual Loran signal, thereby affording more information concerning the actual Loran waveform than was available where no noise contaminated the original input waveform. Thus, by using the averaging technique of the present invention, relatively little signal information need be lost despite the resolution limitations of the analog to digital converter.

Figure 13:
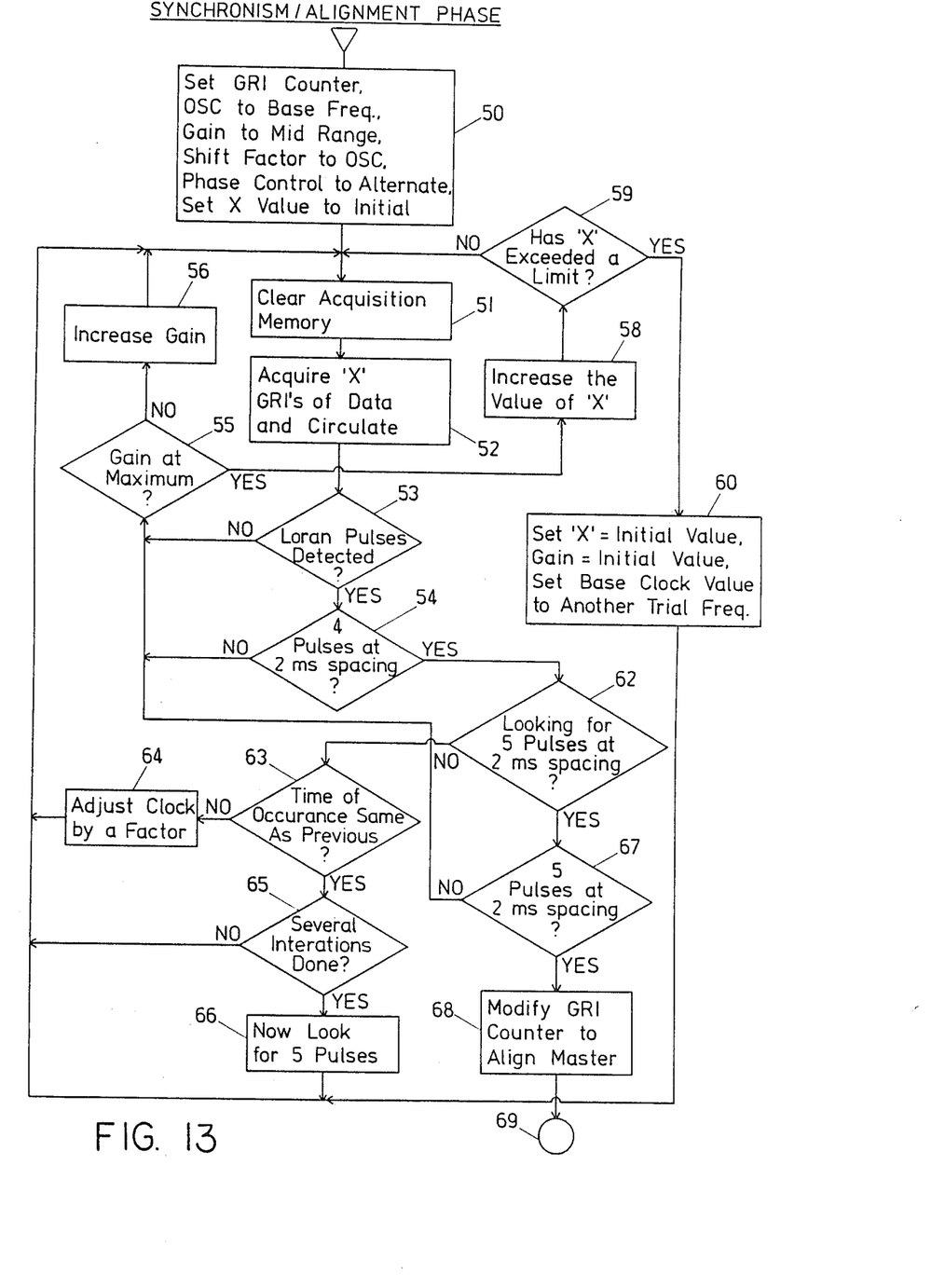
FIG. 13 is a flow diagram showing the program operating steps of the computer unit within the receiver during the synchronism-alignment phase of operation.

The program steps carried out by the microprocessor unit for initial acquisition of the Loran C stations is illustrated by the flow chart of FIG. 13. The program begins by initially setting values for system parameters which can be provided either from default settings in system memory or input from the front panel from the user at block 50. The initial parameters include the GRI counter initial maximum, the master oscillator frequency, the starting gain of the front-end amplifiers, the number of averages needed, and the shifting and phase coding patterns. The initial number of GRI periods to be averaged is defined by a number "x", which is set to a suitable initial value, e.g., 10. The acquisition memory is then cleared (51) and "x" GRI's of data are acquired and circulated in the acquisition memory (52). The data in memory is circulated through a cycle detector to determine the occurrence and time of any Loran pulses that have been received. The data is checked (53) to determine if, for example, at least four pulses are detected at two milliseconds time spacing, which, if found, allows the assumption to be made that either a master or secondary station has been detected, and comparisons can then be made regarding the amount of drift or shifting that is occurring from one acquisition period to another (54). Four Loran pulses two milliseconds apart will be found from either master or secondary station groups where phase coding is used to produce the averaged pulses as illustrated in FIG. 10b. If Loran pulses are not detected or if four pulses at two millisecond spacing are not detected, the program then checks to determine if the gain is at a maximum (55). If not, the gain is increased (56) and the program begins anew by clearing the acquisition memory at 51 and acquiring "x" GRI's of data. If the gain at 55 is found to be at a maximum, the value of "x" is increased (58) by a predetermined increment and the resulting value of "x" is checked with respect to a limit value (59). If "x" has not exceeded the limit, the program cycles again to clear the acquisition memory and acquire the new number "x" of GRI's. The consequence of these program steps is that if any Loran C station is not initially detected, the gain is progressively increased until either a station is eventually detected or there is no further gain remaining. In the latter case, the number of GRI periods in which data is acquired is increased in an attempt to synchronize to a weaker station. If both procedures fail to find any station, there may then be too much deviation between the rate of the local master oscillator and the Loran chain transmission rate. Thus, if at the decision point 59 the increased value of "x" has exceeded the limit, the program then proceeds to set "x" and the gain to the initial value and the base clock frequency is set to another trial frequency which is varied by an incremental amount from the initial base clock frequency (60). The program then returns to block 51 to clear the acquisition memory and begin the process again.

Eventually, the receiver will find one of the stations within the Loran chain and establish synchronism with it. The receiver can now begin to look for the master station by a process of increasing the gain and the number of acquisitions per evaluation period. The program does this, after the four pulses at two milliseconds spacing are found at block 54, by initially looking to determine whether the program is in a cycle looking for five pulses (62), which initially it will not be. If the program has not been set to look for five pulses, it then checks to determine whether the time of occurrence of the pulses in the memory is the same as the time of occurrence of the previous acquired pulses (63); if not, the internal clock is adjusted by a selected factor, and the program recycles back to block 51 to clear the acquisition memory and acquire new data. The cycle of acquisition and detection of pulses as described above continues until the clock has been adjusted so that, as tested at 63, the time of occurrence of the later acquired pulses is the same as that of the earlier acquired pulses, indicating that the clock is now in synchrony with the GRI. The program will then check to determine whether a selected number of iterations have been done (64) and, if not, will cycle back to block 51 to repeat the process to assure that a sufficient check has been made to confirm that the internal clock is in synchrony with the GRI. When several iterations have been done, the program then sets a flag indicating that it is looking for five pulses (65) and cycles back to clear the acquisition memory at 51 and begin acquiring data again. When sufficient data is acquired the program now determines that it is looking for five pulses at the decision point 62 and then determines if, in fact, five pulses at two milliseconds spacing are found. If not, the program looks to see if the gain is a maximum at block 55 and if not increases the gain at block 56 before recycling. When five pulses spaced two milliseconds apart are found, the master station within the GRI has been found and the processor can then realign the acquisition frame through a slight and momentary change in the GRI count (68). This process aligns the master pulses to the beginning of the GRI pulse interval, which somewhat simplifies the eventual task of determining interstation time delays and the subsequent calculations based on these time delays. With synchronization of the receiver with the GRI established, the program exits at 69 from the synchronism/alignment phase and enters the gain ranging phase as shown in the flow chart of FIG. 14.

Figure 14:
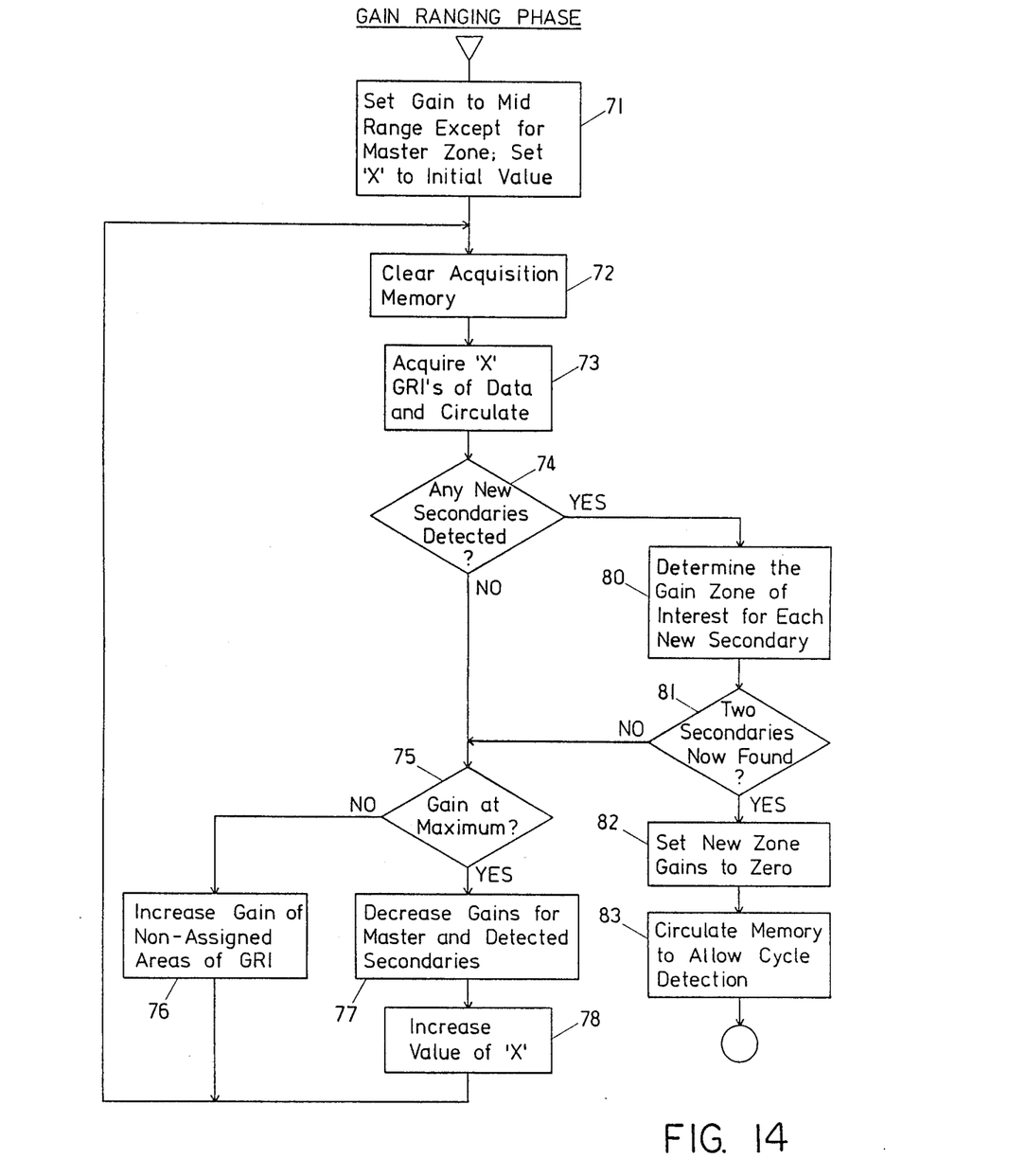
FIG. 14 is a flow diagram showing the program operating steps of the computer unit within the receiver during the gain ranging phase of operation.

Upon entry into the gain ranging phase, the gain is initially set to the mid-range except for the zone of the master pulses and a value of "x" is set to a selected initial value (71). In this phase, the gain in the non-master portion of the GRI period is progressively increased until two secondaries are found. In a manner similar to the synchronism phase, if the gain capability runs out before any two secondaries are found, an increase in the number of acquisitions is done with initially lesser gain until the two stations of interest are finally found. The gain values associated with these stations are assigned to groups whose length will match the length of the secondary pulse transmissions. The intervals between the groups are of no interest and the gain is reduced to zero there. With the master and secondaries detected, the processor can now derive meaningful time delay values from the waveforms through the use of either hardware or software based cycle detectors. After the calculations are complete, the processor can restart the entire acquisition process but with parameters which are now close if not equal to the correct values needed. Therefore, subsequent synchronism, master and secondary group alignment and gain zone definition will occur very rapidly, as will the subsequent updating of the navigation data being displayed or utilized by other equipment.

With respect to the flow diagram of FIG. 14 showing the program steps to accomplish this procedure, after the initial setting of gain paramenters at 71, the acquisition memory is cleared (72) and "x" number of GRI's of data are acquired, written into the memory and circulated (73). The data in the memory is then inspected to determine whether any new secondaries are detected (74) and, if not, the program then checks to determine if the gain is at a maximum (75). If not, the gain is increased in the nonassigned area of the GRI (76), and the program cycles back to clear the acquisition memory. If the gain is at a maximum, the gains for the master and detected secondaries are increased (77) and the value of "x" is increased before the program cycles back to clear the acquisition memory at 72 and acquire new data. When a new secondary is detected at 74, the gain zone of interest for each new secondary is determined (80) and the program checks the data to see if two secondaries are now found (81). If not, a check is made to determine if the gain is at a maximum at 75 and the gain is either increased at 76 or the gains for the master and detected secondaries are decreased and the value of "x" is increased at 77 and 78 before the program recycles to collect new data. This cycle continues until two secondaries are found at 81, at which time the non-zone gains are reduced to zero (82) and the memory is circulated to allow cycle detection, which may be carried out in a conventional manner either with analog hardware circuitry or by software programming in a conventional fashion.

As noted above, the acquisition and averaging of data over many GRI periods causes non-coincident signals such as noise, continuous wave interference and cross rate interference to be added in a random pattern to the signals of interest. Simultaneously, at least half of the Loran C signals of interest will see successive increases in amplitude due to the coincident nature of their transmission. The overall effect is an improvement in the signal to noise ratio that follows the square root of the number of GRI periods averaged. After the averaging has been completed, the resulting processed information is used by the cycle detector to establish reference points on the individual pulses. With these reference points determined, conventional techniques are utilized to perform the calculations to derive navigational data from the information obtained from the Loran C waveforms.

Figure 15:
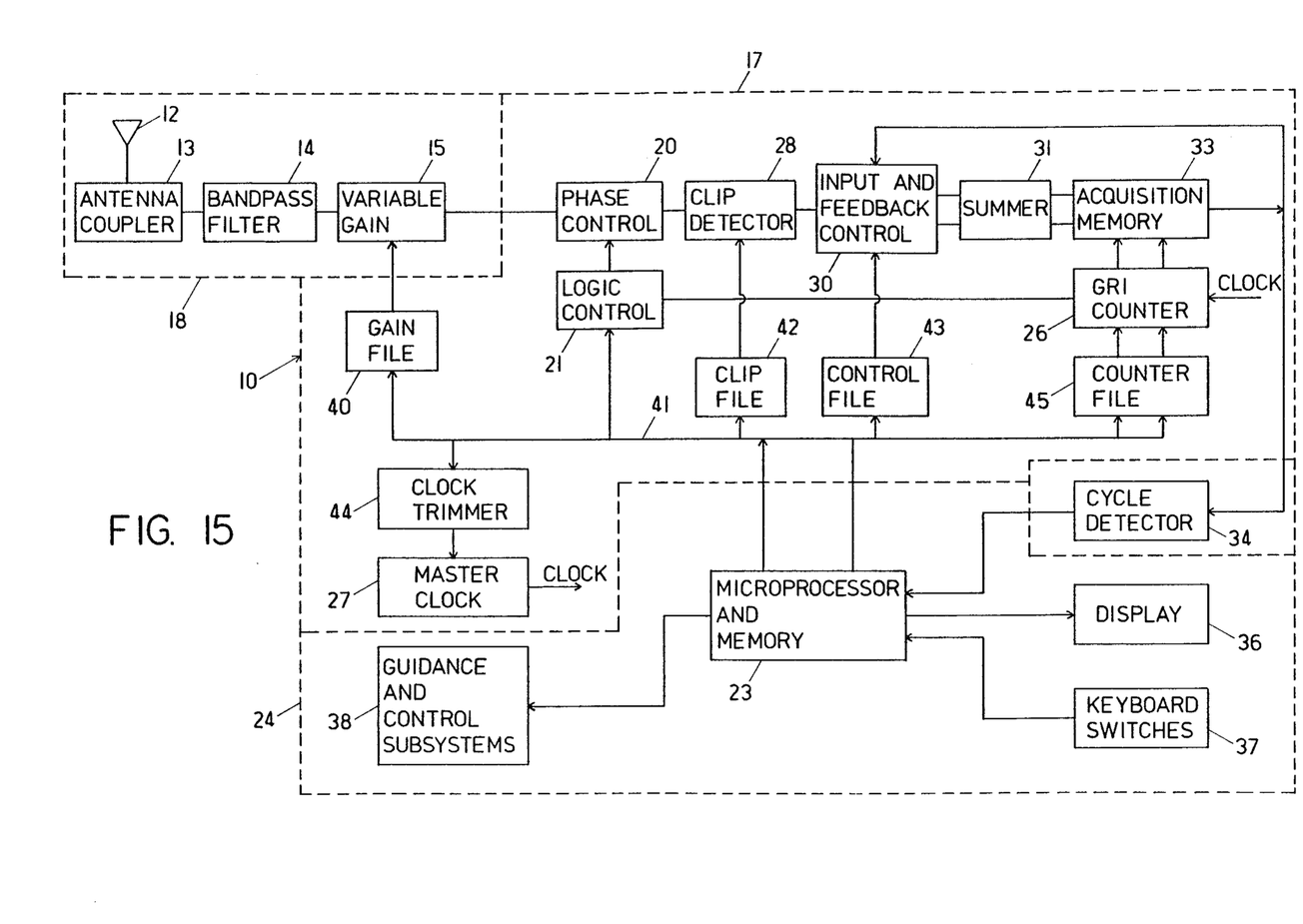
FIG. 15 is a block diagram showing the functional elements of a LORAN C receiver incorporating the present invention and utilizing an analog memory for ensemble averaging.

An embodiment of the invention utilizing analog memory is shown in FIG. 15. The same signal averaging operations are performed but by analog components. The acquisition memory 33 consists of high speed analog memory such as the Analytek AN101 Microstore device. The cycle detector 34 samples the analog signal at the output of the memory 33 and is of conventional design for Loran receivers. The phase control 20 is connected directly to the variable gain circuit 15 and consists of an inverting amplifier and digitally controlled analog switch multiplexor. The logic control block 21 drives the multiplexor of the phase control 20, selecting the input or output of the inverting amplifier to control phase. The clip detector 28 operation is performed by an analog window comparator which detects signal excursions beyond fixed predetermined levels. The clip file 42 accumulates a count of thse excursions and may be simply a counter/timer associated with the microprocessor. Input and feedback control block 20 consists of digitally controlled analog switch multiplexors while the summer 31 adds incoming and memory signals. Numerous other divisions of analog and digital hardware responsibilities are possible and will be readily apparent to those of ordinary skill in the art.

It is understood that the invention is not confined to the particular embodiments set forth herein as illustrative, but embraces such modified forms thereof as come within the scope of the following claims.

What is claimed is:

1. A method of receiving and processing Loran C radio navigation signals comprising the steps of:
   (a) receiving a radio signal containing the Loran C signal of interest;
   (b) sampling the received signal at periodic points in time and providing data corresponding thereto;
   (c) determining and synchronizing the group repetition interval of the Loran C signal of interest contained in the data; and
   (d) ensemble averaging together signal data synchronized to the group repetition interval over two or more group repetition intervals.

2. A method for receiving and processing Loran C navigational signals comprising the steps of:
   (a) receiving a radio signal containing the Loran C signal of interest;
   (b) sampling the received signal at periodic points in time and providing data corresponding thereto;
   (c) storing the data in a memory at memory locations which correspond to selected points in time during the group repetition interval of the Loran C chain of interest;
   (d) averaging subsequently received data on a point by point basis with the data stored at the locations in the memory and storing the results in the memory locations to replace the originally stored data such that the new data are sampled at the same points in time during the group repetition interval as the old data with which it was ensemble averaged.

3. The method of claim 2 wherein the steps of sampling the received signal is performed to provide digital data.

4. The method of claim 2 wherein prior to the step of storing, the steps of comparing the magnitude of each sample of data immediately prior to the pulse interval of interest with a maximum allowable amplitude, keeping a count of the number of times the maximum amplitude is exceeded per a chosen interval, and, only if the count does not exceed a chosen limit proceeding to the step of averaging the subsequently received data.

5. The method of claim 3 including the step of complementing the digital data sampled in every other group repetition interval before the steps of averaging the digital data with the data in the corresponding memory locations.

6. The method of claim 2 including the additional steps of searching the data stored in the memory to locate the position within the memory of the pulses corresponding to the master station and the pulses corresponding to the secondary stations, locating the time at which new data will be received from the master and secondary stations and selectively adjusting the gain applied to the signal prior to sampling the signal such that the gain during the periods of the expected master station pulses and the secondary station pulses are adjusted to compensate for the relative strength of the signals from the different stations.

7. A method of receiving and processing a Loran C navigational signal comprising the steps of:
 (a) receiving a radio signal containing the Loran C signal of interest;
 (b) sampling the received signal at periodic points in time to provide data corresponding thereto;
 (c) storing the data in a recirculating memory which circulates periodically with a period corresponding to an initially chosen group repetition interval; and
 (d) averaging subsequently acquired data sampled from the received signal with the data stored in the memory and writing the averaged data into the memory locations of the memory at the rate at which the memory circulates.

8. The method of claim 7 including the additional steps of;
 (e) searching the data accumulated in the memory after data from several group repetition interval periods have been averaged in the memory to determine if a group of Loran pulses of proper spacing are present in the data stored in the memory; and
 (f) if there are no proper Loran pulses detected in the averaged data in the memory, clearing the memory and repeating steps (a)–(e) using a different selected group repetition interval.

9. The method of claim 7 wherein the step of sampling the received signal is performed to provide digital data.

10. The method of claim 9 wherein the digital data sampled in every other group repetition interval is complemented before being averaged with the digital data in the corresponding memory locations.

11. The method of claim 8 wherein the step of searching the data accumulated in the memory to determine if a proper group of Loran pulses are present comprises searching for a series of four pulses spaced two milliseconds apart.

12. Apparatus for receiving and processing Loran C navigation signals comprising:
 (a) means for receiving a radio signal containing the Loran C signal of interest and providing an electrical signal corresponding thereto;
 (b) means for sampling the electrical signal at periodic points in time to provide data corresponding thereto;
 (c) an acquisition memory having addressable locations for storing data;
 (d) group repetition interval counter means for causing data to be stored in the acquisition memory at memory locations which are cycled every selected group repetition interval; and
 (e) means for averaging the sampled data as received from the means for sampling with the data at the corresponding memory location within the group repetition interval and storing the averaged data at the memory location.

13. The apparatus of claim 12 wherein the means for sampling comprises an analog to digital converter which provides digital data.

14. The apparatus of claim 12 wherein the means for averaging adds the data in the acquisition memory location with the new sampled data.

15. The apparatus of claim 12 including means for comparing each data sample from the means for sampling with a maximum allowable amplitude.

16. The apparatus of claim 13 including means, connected to receive the data from the analog to digital converter and to the group repetition interval counter means, for complementing the digital data in every other group repetition interval before passing such data to the means for averaging.

17. The apparatus of claim 12 including means for searching the data stored in the acquisition memory after the data from several group repetition intervals has been averaged in the acquisition memory to locate the position within the memory of the pulses corresponding to the master station and the pulses corresponding to secondary stations, for locating the time at which new data will be received from the master and secondary stations and for selectively adjusting the gain of the signal prior to the means for sampling such that the gain during the periods of the expected master station pulses and the expected secondary station pulses is adjusted to compensate for the relative strength of the signals from the different stations.

18. The apparatus of claim 12 including means for searching the data accumulated in the acquisition memory after several group repetition interval periods have been averaged to determine if a proper group of Loran pulses of proper spacing are present in the data.

19. The apparatus of claim 18 wherein the means for sampling comprises an analog to digital converter which provides digital data, and including means connected between the analog to digital converter and the means for averaging, for complementing the digital data in every other group repetition interval before passing the digital data to the means for averaging, and wherein the means for searching the data in the acquisition memory to determine if a proper group of Loran pulses of proper spacing are present searches for a series of four pulses each spaced two milliseconds apart.

* * * * *